United States Patent
Cohen et al.

(10) Patent No.: US 8,706,596 B2
(45) Date of Patent: Apr. 22, 2014

(54) ACCOUNT PORTFOLIO RISK CHARACTERIZATION

(75) Inventors: Michael Raymond Cohen, Denver, CO (US); Chenyang Lian, El Cerrito, CA (US); Lara D. Mercurio, Berkeley, CA (US); Jeffrey A. Feinstein, Roswell, GA (US)

(73) Assignee: Fair Isaac Corporation, San Jose, CA (US)

( * ) Notice: Subject to any disclaimer, the term of this patent is extended or adjusted under 35 U.S.C. 154(b) by 841 days.

(21) Appl. No.: 12/105,185

(22) Filed: Apr. 17, 2008

(65) Prior Publication Data

US 2009/0265281 A1   Oct. 22, 2009

(51) Int. Cl.
*G06Q 40/00* (2012.01)

(52) U.S. Cl.
USPC .............................. 705/36 R; 705/35; 705/37

(58) Field of Classification Search
USPC .......................................... 463/42; 705/36 R
See application file for complete search history.

(56) References Cited

U.S. PATENT DOCUMENTS

| 7,191,150 B1* | 3/2007 | Shao et al. ................... 705/38 |
| 7,653,593 B2 | 1/2010 | Zarikian et al. |
| 2002/0123953 A1* | 9/2002 | Goldfarb et al. .............. 705/36 |
| 2009/0125439 A1* | 5/2009 | Zarikian et al. ............... 705/38 |
| 2009/0215537 A1* | 8/2009 | Poff .............................. 463/42 |

* cited by examiner

*Primary Examiner* — Hai Tran
(74) *Attorney, Agent, or Firm* — Mintz Levin Cohn Ferris Glovsky and Popeo, P.C.

(57) ABSTRACT

Input characterizing one or more economic indicators and a portfolio of accounts can be used to estimate a portfolio level effect of the economic indicators on the portfolio of accounts is estimated. Based on this estimation, an account level effect of the economic indicators is simulated for each of the accounts. The overall affect of the simulated account level effects approximates the portfolio level effect. Simulated account level effects can thereafter be aggregated in order to characterize future risk for the portfolio of accounts. Related apparatus, systems, techniques and articles are also described.

19 Claims, 2 Drawing Sheets

ACCOUNT PORTFOLIO RISK CHARACTERIZATION

TECHNICAL FIELD

The subject matter described herein relates to techniques, systems, and articles for the characterization of risk for a portfolio of accounts.

BACKGROUND

Institutions, portfolio managers, and fund managers seek to characterize risk in portfolios of accounts such as asset/mortgage backed loan portfolios. The composition of such portfolios are dynamic in nature and are difficult to model based on their increasing levels of complexity. For example, variations and shocks in economic indicators such as interest rates, employment rates, Employment Cost Index, employment situation, and the like through economic cycles, are difficult to translate into risk metrics as historical data for a portfolio of the same or similar composition does not exist.

SUMMARY

Input characterizing one or more economic indicators and a portfolio of accounts can be used to estimate a portfolio level effect of the economic conditions on the portfolio of accounts. Based on this estimation, an account level effect of the economic indicators is simulated for each of the accounts so that the overall affect of the simulated account level effects approximates the portfolio level effect. Simulated account level effects can thereafter be aggregated in order to characterize future risk for the portfolio of accounts.

The account level effects can, in some implementations, comprise credit scores. In such variations, at least one transition matrix can be generated and displayed that characterizes a probability of a credit score increase/decrease to predetermined score ranges as a result of the one or more economic indicators. A transition matrix can alternatively, or in addition, be used to estimate the portfolio level effect of the economic indicators.

Input characterizing optimization criteria for the portfolio of accounts can also be received. From such optimization criteria, a subset of accounts in the portfolio of accounts meeting the optimization criteria can be identified. Such subsets can, for example, be packaged for various purposes including sale, balancing, and the like.

The simulation can be based on a Monte Carlo approach. In one implementation, a domain of possible variables to use in determining the account level effect is defined. The domain of possible variables is selected to approximate the portfolio level effect. A plurality of variables are then randomly generated within the domain of possible variables. Each of the accounts is assigned one or more of the randomly generated variables so that, for each account, a corresponding account level affect can be determined using the assigned randomly generated variables.

In some implementations, a variety of "linked" simulations can be initiated in order to identify and to characterize patterns present in the data. For example, a consumer whose behavior starts changing in one dimension usually changes in a few other dimensions in a correlated way, and the subject matter described herein captures such effect. In some variations, if the economic impact of a macroeconomic indicator is simulated on each dimension separately/randomly, some linked behaviors may be missed.

In an interrelated aspect, input characterizing one or more economic indicators and a portfolio of accounts is received. Thereafter, a portfolio level effect of the economic indicators on the portfolio of accounts is estimated. An account level effect of the economic indicators is simulated for each of the accounts so that an overall affect of the simulated account level effects approximating the portfolio level effect. The simulating can include defining a domain of possible variables to use in determining credit scores for the accounts in the portfolio, the domain of possible variables selected to approximate the portfolio level effect, randomly generating a plurality of variables within the domain of possible variables, assigning each of the accounts with one or more of the randomly generated variables, and determining, for each account, a simulated credit score using the assigned randomly generated variables. The simulated credit scores can be aggregated to enable a characterization of future risk for the portfolio of accounts.

Articles are also described that comprise a machine-readable medium embodying instructions that when performed by one or more machines result in operations described herein. Similarly, computer systems are also described that may include a processor and a memory coupled to the processor. The memory may encode one or more programs that cause the processor to perform one or more of the operations described herein.

The subject matter described herein provides many advantages. For example, by having insight into future portfolio performance, institutions can make more informed aggregate risk/capital management decisions to ensure appropriate capital reserves, portfolio managers can make portfolio-level credit decisions (increase or decrease available credit to customers in the portfolio), treasury departments and sell-side institutions can establish 'premium pricing' for portfolio sales that are less susceptible to changing economic conditions than peer portfolios, risk departments can more effectively bundle multiple portfolios for optimized risk characteristics, and buy-side institutions can get better insight into the performance of portfolios prior to their purchase by applying economic forecasts to achieve portfolio performance modeling.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
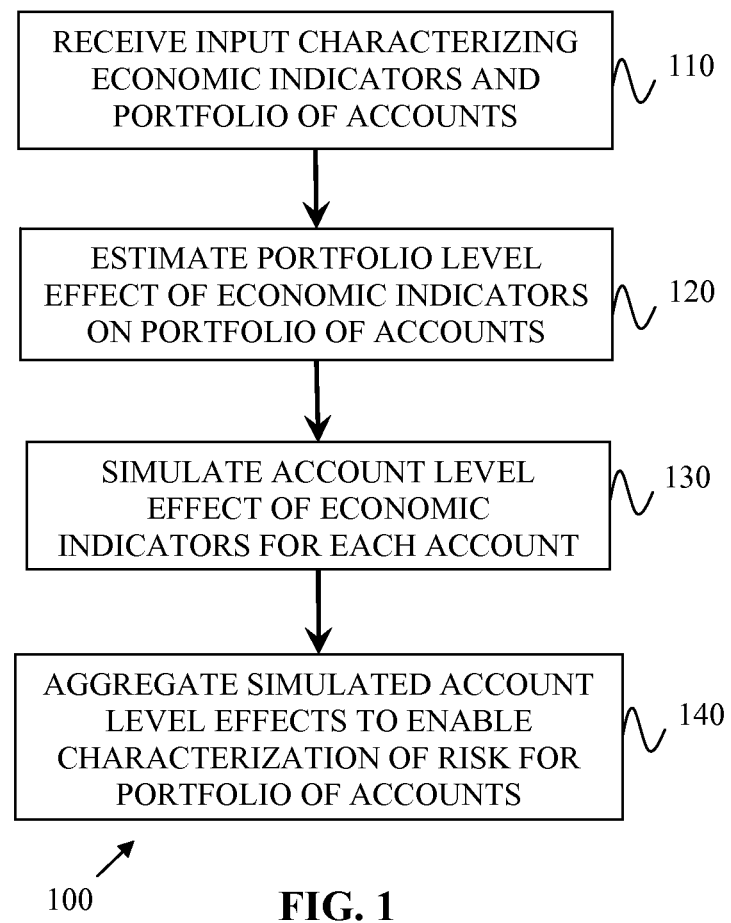
FIG. 1 is a process flow diagram illustrating a method for characterizing future risk for a portfolio of accounts.

FIG. 1 is a process flow diagram illustrating a method 100, in which, at 110, input characterizing one or more economic indicators and a portfolio of accounts is received. Thereafter, at 120, a portfolio level effect of the economic indicators on the portfolio of accounts is estimated. Based on this estimation, at 130, an account level effect of the economic indicators is simulated for each of the accounts. The overall affect of the simulated account level effects approximating the portfolio level effect. Simulated account level effects can, at 140, be aggregated in order to characterize future risk for the portfolio of accounts.

The economic indicators can comprise any data, measurements, scores, etc. relevant to monitoring a level of economic growth (or decline) on national, regional, or local levels. Such economic indicators can be used herein to monitor a level of risk in connection with a portfolio of accounts (e.g., loan portfolios, etc.). The economic indicators can comprise, for example, macro-economic indicators over a pre-defined period of time characterizing factors such as output; income; employment, unemployment, and earnings; production and business activity; prices; money, credit, and securities markets; transportation; international statistics, and the like. Such economic indicators may reflect past economic performance and/or be based on forecasts of future economic performance. It will be appreciated that the listed economic indicators are only a small subset of economic indicators that might be utilized. Other types of economic indicators may be utilized depending on the composition of the portfolio. Economic indicators may be transformed as inputs to the forecasting models to enhance the model prediction power.

Using forecasting models, the economic indicators are used as inputs to estimate a portfolio level macroeconomic effect. In some implementations, the portfolio level effect of the one or more economic indicators can be estimated using, for example, a transition matrix (see, for example, Sarfaraz Ahmed, Michael Cohen, and Santiago Libreros, "Use of Transition Matrices in Risk Management and Valuation", Fair Isaac Corporation white paper, September 2004, the contents of which are hereby incorporated by reference). One example of a (k-year) transition matrix in connection with credit ratings can be represented by P which contains n and n rows and where each entry is the probability of moving from one given credit rating to another given credit rating in k years. While the estimated portfolio level effect might provide one characterization of risk for the portfolio, metrics characterizing risk generated from individual accounts within the portfolio can also be useful.

The estimated portfolio level effect can be used to generate a simulation to determine the effect of the economic indicator on the accounts of the portfolio. One group of approaches that can be used for such simulation is collectively referred to as the Monte Carlo method. With such an approach, a domain of possible inputs is defined, inputs are randomly generated from the domain so that a deterministic computation can be performed on them. The results of the individual computations can then be aggregated into a final result. In this case, the estimated portfolio level effect can be equal (or substantially equal) to the estimated portfolio level effect so that the domain of possible inputs can defined such that the randomly generated inputs can result in a change at the portfolio level approximating or equal to the estimated portfolio level effect. However, additional information relevant to a level of risk for the portfolio can be aggregated/obtained from the individual computations such as metrics relating to the account level effect of the economic indicator.

In some variations, the estimated portfolio level effect can identify linked behaviors and run corresponding linked simulations to identify and to characterize patterns present in the data. For example, a consumer whose behavior starts changing in one dimension usually changes in a few other dimensions in a correlated way and so the consumer's behavior can also be simulated to change in such dimensions.

In some variations, the portfolio of accounts can comprise financial instruments such as mortgages, home lines of credit, and the like. In such arrangements, the account level effect can be characterized by a credit score (i.e., numbers that reflect the credit risk level of the account holder) for the account holder(s). Despite such financial instruments already having been issued, credit scores can be used to identify future risk in connection with each account holder. On a portfolio level, an aggregated metric based on individual credit scores can also be useful in characterizing risk for the portfolio as a whole.

A variety of types of credit scores can be utilized depending on the desired implementation. For example, FICO® credit scores, VantageScore® credit scores, CreditXpert® credit scores, NextGen® credit scores, Community Empower® credit score, Behavior credit scores, and the like can be utilized. Credit scores are typically constructed from a plurality of weighted variables. These variables characterize various aspects of a consumer that can be useful in determining the creditworthiness of the consumer. Variables can comprise personalized and depersonalized consumer information—including current credit scores and supporting asset/liability credit bureau and/or institutional master file data, and the like. With the current techniques and systems, the estimated portfolio level effect is used to randomly calculate these variables. Thereafter, one or more credit scores are calculated for the consumer based on these newly calculated variables, and such credit scores can be, for example, aggregated.

The aggregated simulated account level effects can be displayed in a variety of manners. For example, transition matrices can be displayed to a user that characterize a probability of a credit score increase/decrease to predetermined score ranges as a result of the economic indicator (see, for example, Ahmed et al. "Use of Transition Matrices in Risk Management and Valuation").

The techniques and systems described herein can be applied, for example, against a loan portfolio to predict credit score distribution shifts across the portfolio—enabling portfolio managers to assess the future credit score profile of an existing loan pool. The aggregated simulated account level effects can be used in a variety of ways, including, for example, determining a probability of portfolio impacts such as forecasting loan loss, default, late payments, etc. Risk management functions within an organization can be improved with such information. Moreover, risk and pricing of portfolio sales in an external asset-based securities market can be enhanced and various "what-if" scenarios can be modeled in order to further mitigate risk across a portfolio or a subset of a portfolio.

In some implementations, the composition of a portfolio can be determined based on pre-determined optimization criteria. Such optimization criteria can be used to identify groupings of accounts in the portfolio having pre-determined characteristics, either on an individual account basis, or on the basis of the entire group of accounts.

Figure 2:
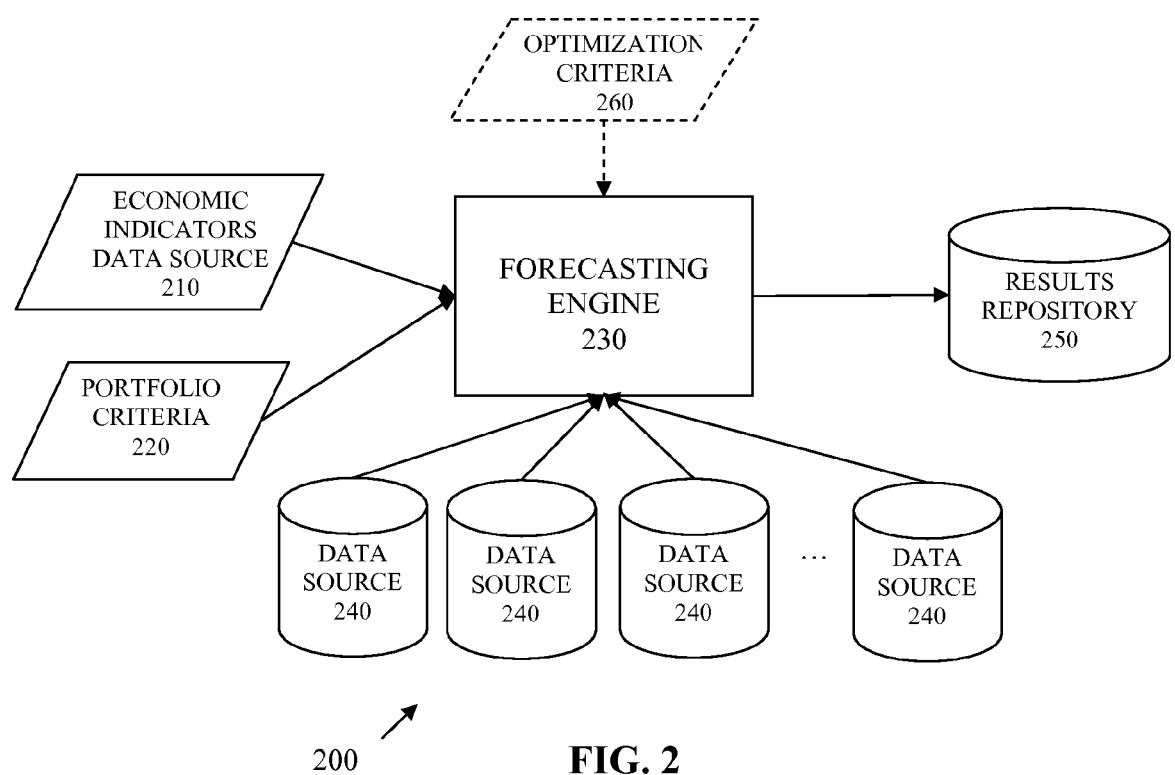
FIG. 2 is a diagram illustrating inputs and outputs to a forecasting engine.

FIG. 2 is a diagram 200 illustrating the various inputs and outputs of a forecasting engine 230 that can be used to implement the techniques described herein. An economic indicators data source 210 can provide econometric data such as metrics relating to GDP, interest rates, unemployment rates, housing starts, factory orders, productivity indices, regional data, and the like. Portfolio criteria 220 can be used to provide information associated with the portfolio of accounts such as portfolio data sets, portfolio subsets, timelines, criteria for selecting accounts, baseline comparisons for the accounts, and the like. The forecasting engine 230 can be coupled to a plurality of data sources 240 that provide a wide range of information pertaining to individual accounts within the portfolio as well as the portfolio as a whole. The data sources 240 may provide information such as master file data, portfolio data, economic data, external economic models, credit bureau data/attributes, custom analytic models, packaged analytic models, portfolio and credit bureau characteristics and the like. Using the techniques described above, the forecasting engine 230 uses the various inputs 210, 220, 230 to generate aggregated account level effect data which can be stored, for example, in a data warehouse such as results repository 250. The results repository 250 can allow for the generation of tables and other data sets and for actions to be conducted thereon. The results repository 250 can also be used to generate reports for promotion (e.g., e-mail, display, etc.) to a user including transition reports, forecast reports, baseline analyses, and the like.

In some implementations, optimization criteria 260 can be provided to the forecasting engine 230. In such arrangements, the optimization criteria may used to package or otherwise identify a subset of the accounts within the portfolio of accounts to maximize certain attributes of the portfolio (e.g., average credit score, etc.), minimize certain attributes of the portfolio (e.g., likelihood of default, etc.), and/or optimize certain attributes (e.g., geographic distribution of account holders). These subsets of accounts can be flagged for special treatment if needed and/or packaged for sale and the like.

As credit scores are a well adopted technique of assessing credit risk, the future disposition (migration up or migration down) of credit scores impacted by economic changes represents a valuable forecasting tool. With conventional systems, credit scores have been primarily reserved for point of origination decisions and ongoing account management/customer management credit-risk decisions. By applying multi-variable forecasting techniques to accounts and customers within a portfolio, the current techniques and systems are able to predict the future performance of a portfolio given specific economic conditional change.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. An article comprising a non-transitory machine-readable storage medium embodying instructions that when performed by one or more machines result in operations comprising:
   receiving input characterizing one or more economic indicators and a portfolio of accounts;
   estimating a portfolio level effect of the economic indicators on the portfolio of accounts;
   simulating an account level effect of the economic indicators for each of the accounts, the account level effect comprising a credit score, an overall effect of the simulated account level effects approximating the portfolio level effect; and
   aggregating the simulated account level effects to enable a characterization of future risk for the portfolio of accounts.

2. An article as in claim 1, wherein the one or more economic indicators comprise a macro-economic indicator.

3. An article as in claim 1, wherein the one or more economic indicators comprise a micro-economic indicator.

4. An article as in claim 1, wherein the machine-readable storage medium further embodies instructions that when performed by one or more machines result in operations comprising:
   receiving input defining a composition of the portfolio of accounts.

5. An article as in claim 1, wherein the machine-readable storage medium further embodies instructions that when performed by one or more machines result in operations comprising:
   generating and displaying at least one transition matrix that characterizes a probability of a credit score increase/decrease to predetermined score ranges as a result of the one or more economic indicators.

6. An article as in claim 1, wherein the portfolio level effect of the economic indicators on the portfolio of accounts is estimated using at least one transition matrix.

7. An article as in claim 1, wherein the machine-readable storage medium further embodies instructions that when performed by one or more machines result in operations comprising:
receiving input characterizing optimization criteria for the portfolio of accounts; and
identifying a subset of accounts in the portfolio of accounts meeting the optimization criteria.

8. An article as in claim 1, wherein the simulating comprises:
defining a domain of possible variables to use in determining the account level effect, the domain of possible variables selected to approximate the portfolio level effect;
randomly generating a plurality of variables within the domain of possible variables;
assigning each of the accounts with one or more of the randomly generated variables; and
determining, for each account, a corresponding account level affect using the assigned randomly generated variables.

9. An article as in claim 1, wherein the simulating utilizes a Monte Carlo simulation approach.

10. A method as in claim 1, wherein the simulating utilizes a Monte Carlo simulation approach.

11. A method for implementation by one or more data processors comprising:
receiving, by at least one data processor, input characterizing one or more economic indicators and a portfolio of accounts;
estimating, by at least one data processor and using at least one transition matrix, a portfolio level effect of the economic indicators on the portfolio of accounts;
simulating, by at least one data processor, an account level effect of the economic indicators for each of the accounts, an overall effect of the simulated account level effects approximating the portfolio level effect; and
aggregating, by at least one data processor, the simulated account level effects to enable a characterization of future risk for the portfolio of accounts.

12. A method as in claim 11, wherein the one or more economic indicators comprise a macro-economic indicator.

13. A method as in claim 11, wherein the one or more economic indicators comprise a micro-economic indicator.

14. A method as in claim 11 further comprising:
receiving, by at least one data processor, input defining a composition of the portfolio of accounts.

15. A method as in claim 11, wherein the account level effects comprise credit scores.

16. A method as in claim 15 further comprising:
generating and displaying, by at least one data processor, at least one transition matrix that characterizes a probability of a credit score increase/decrease to predetermined score ranges as a result of the one or more economic indicators.

17. A method as in claim 11 further comprising:
receiving, by at least one data processor, input characterizing optimization criteria for the portfolio of accounts; and
identifying, by at least one data processor, a subset of accounts in the portfolio of accounts meeting the optimization criteria.

18. A method as in claim 11, wherein the simulating comprises:
defining, by at least one data processor, a domain of possible variables to use in determining the account level effect, the domain of possible variables selected to approximate the portfolio level effect;
randomly generating, by at least one data processor, a plurality of variables within the domain of possible variables;
assigning, by at least one data processor, each of the accounts with one or more of the randomly generated variables; and
determining, by at least one data processor, for each account, a corresponding account level affect using the assigned randomly generated variables.

19. An article comprising a non-transitory machine-readable storage medium embodying instructions that when performed by one or more machines result in operations comprising:
receiving input characterizing one or more economic indicators and a portfolio of accounts;
estimating a portfolio level effect of the economic indicators on the portfolio of accounts;
simulating an account level effect of the economic indicators for each of the accounts, the account level effect comprising a credit score, an overall effect of the simulated account level effects approximating the portfolio level effect;
generating and displaying at least one transition matrix that characterizes a probability of a credit score increase/decrease to predetermined score ranges as a result of the one or more economic indicators; and
aggregating the simulated account level effects to enable a characterization of future risk for the portfolio of accounts;
wherein the simulating comprises:
defining a domain of possible variables to use in determining the account level effect, the domain of possible variables selected to approximate the portfolio level effect;
randomly generating a plurality of variables within the domain of possible variables;
assigning each of the accounts with one or more of the randomly generated variables; and
determining, for each account, a corresponding account level affect using the assigned randomly generated variables.

* * * * *